United States Patent
Dharap

(10) Patent No.: US 6,950,994 B2
(45) Date of Patent: Sep. 27, 2005

(54) DATA LIST TRANSMUTATION AND INPUT MAPPING

(75) Inventor: Sanjeev Dharap, Fremont, CA (US)

(73) Assignee: Yahoo! Inc., Sunnyvale, CA (US)

(*) Notice: Subject to any disclaimer, the term of this patent is extended or adjusted under 35 U.S.C. 154(b) by 0 days.

(21) Appl. No.: 09/938,802

(22) Filed: Aug. 24, 2001

(65) Prior Publication Data

US 2002/0026524 A1 Feb. 28, 2002

Related U.S. Application Data

(60) Provisional application No. 60/230,071, filed on Aug. 31, 2000.

(51) Int. Cl.$^7$ ............................................. G06F 17/30
(52) U.S. Cl. ................................... 715/864; 707/8
(58) Field of Search ......................... 707/7, 10, 101, 707/104.1; 345/705, 712, 713, 776, 777, 816, 853–855, 864–867, 168–172; 709/236, 203; 455/95

(56) References Cited

U.S. PATENT DOCUMENTS

| | | | |
|---|---|---|---|
| 4,782,464 A | 11/1988 | Gray | 364/900 |
| 5,218,700 A | 6/1993 | Beechick | 395/700 |
| 5,377,113 A * | 12/1994 | Shibazaki et al. | 701/209 |
| 5,388,251 A | 2/1995 | Makino | 395/575 |
| 5,671,426 A | 9/1997 | Armstrong, III | 395/760 |
| 5,677,949 A | 10/1997 | Macor | 379/354 |
| 5,786,819 A | 7/1998 | Weiser et al. | 345/354 |
| 5,828,313 A * | 10/1998 | Mochizuki | 340/7.53 |
| 5,867,688 A | 2/1999 | Simmon | 395/500 |
| 6,008,799 A | 12/1999 | Van Kleeck | 345/173 |
| 6,024,571 A | 2/2000 | Renegar | 434/157 |
| 6,262,727 B1 * | 7/2001 | Lentz et al. | 345/866 |
| 6,292,794 B1 | 9/2001 | Cecchini | 707/3 |
| 6,295,060 B1 * | 9/2001 | Lentz et al. | 345/764 |
| 6,307,573 B1 | 10/2001 | Barros | 345/764 |
| 6,310,634 B1 * | 10/2001 | Bodnar et al. | 345/854 |
| 6,417,874 B2 * | 7/2002 | Bodnar | 345/854 |
| 6,433,797 B1 * | 8/2002 | Zellweger | 345/762 |
| 6,487,424 B1 * | 11/2002 | Kraft et al. | 455/566 |
| 6,557,004 B1 * | 4/2003 | Ben-Shachar et al. | 707/102 |
| 6,628,758 B1 * | 9/2003 | Fejes | 379/67.1 |
| 6,697,483 B1 * | 2/2004 | Saarinen et al. | 379/354 |
| 6,731,316 B2 * | 5/2004 | Herigstad et al. | 345/864 |
| 6,741,235 B1 * | 5/2004 | Goren | 345/173 |
| 6,744,451 B1 * | 6/2004 | Anderson et al. | 345/841 |
| 2003/0067495 A1 * | 4/2003 | Pu et al. | 345/811 |
| 2003/0137802 A1 * | 7/2003 | Von Novak | 361/680 |
| 2004/0174400 A1 * | 9/2004 | Herigstad et al. | 345/864 |

FOREIGN PATENT DOCUMENTS

EP 0915604 * 12/1999

OTHER PUBLICATIONS

"StarTAC clipOn Organizer, Synchronization, and TrueSync Desktop—User's Guide," published by Motorola, Inc., Starfish Software, Inc., 1999, pp. 9–11 and 57–60.*

* cited by examiner

Primary Examiner—Maria N. Von Buhr
(74) Attorney, Agent, or Firm—Fliesler Meyer, LLP

(57) ABSTRACT

A method for converting a list of data, each entry in said list having at least one alpha-numeric character, to a format suitable for display and manipulation in a limited display area. The method comprises: sorting said list based on a first of said alpha-numeric characters in each said entry in said list of data; grouping entries into a plurality of sets, each set comprising entries in said list of data having at least a common first character; generating an abbreviated list of said first characters; and linking each entry in said abbreviated list to the corresponding set of entries having said at least common first character.

21 Claims, 4 Drawing Sheets

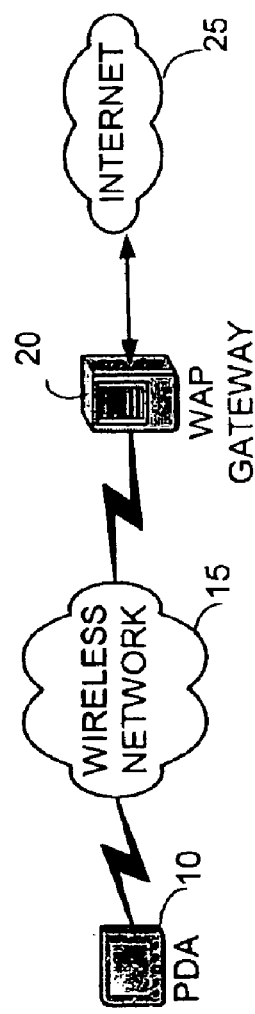
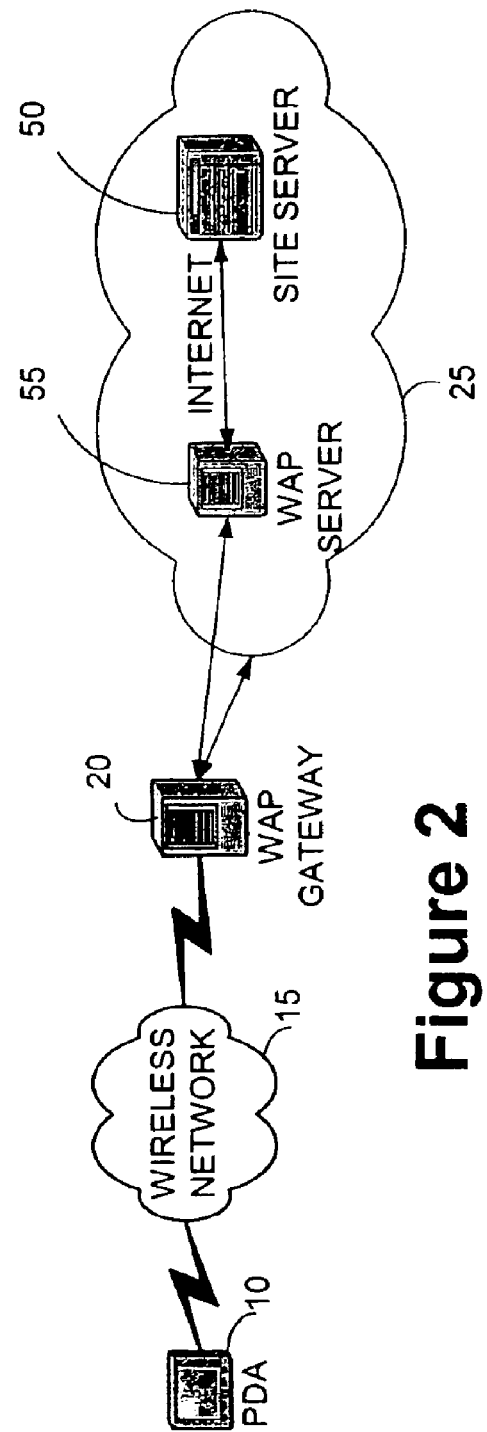

DATA LIST TRANSMUTATION AND INPUT MAPPING

CLAIM OF PRIORITY

This application claims priority from U.S. provisional patent Application No. 60/230,071 entitled "DATA LIST TRANSMUTATION AND INPUT MAPPING," filed Aug. 31, 2000, incorporated herein by reference.

FIELD OF THE INVENTION

The invention relates to the facilitation of the transfer of information over limited bandwidth networks, particularly wireless networks, and specifically to the transfer and presentation of information formatted for display on wireless Internet devices.

BACKGROUND

Currently, a number of different technologies seek to provide the benefits of the Internet, and the World Wide Web in particular, to users any time and anywhere they desire it through wireless technologies. However, both the wireless devices used to access the Internet and the networks which carry information to those devices have limitations.

Wireless devices are significantly smaller and less powerful than desktop or laptop devices which provide more conventional access to the World Wide Web via a web browser. The wireless networks which connect these devices to the Internet do not have the same bandwidth as land-based "wire line" systems, and provide this limited bandwidth at a higher cost, more limited availability and lower quality of service when compared with land-based systems.

One wireless application solution which is gaining popularity is wireless application protocol (WAP). WAP is a standard for bringing together wireless telephones and Internet content services regardless of the wireless network architecture or device type. WAP is designed to work with any type of underlying wireless network architecture, thereby freeing the provider to concentrate on the wireless application itself. As shown in FIG. 1, the WAP model presupposes a WAP client 10, such as a cellular telephone or personal digital assistant (PDA), which is equipped with a micro browser. The WAP client 10 communicates directly with a server on the Internet 25 via a WAP gateway 20 as shown in FIG. 1. The WAP gateway server sits between a wireless carrier's network 15 on one side and the public Internet 25 on the other. (This configuration need not be limited to the public Internet, but may include private Intranets, so that gateways can be located within the carrier or corporate firewalls or both.) The WAP gateway 20 handles the interface between the two sets of network protocols, wireless WAP and wireline TCP/IP. The WAP gateway server decodes and decompresses wireless terminal requests and sends it on to the appropriate web server as an ordinary HTTP request.

Certain wireless carriers have already implemented WAP gateways. If a standard HTML document is served in response to an HTTP request from a WAP cleint 10, the WAP gateway server implements content translation before the request can be relayed back to the WAP client 10. The WAP gateway 20 also imposes data quantity limits on client responses. The gateway limitation means that for each given transaction, only a limited number of bytes may pass through the gateway. This so-called "gateway limit" defines the actual amount of data which may be returned in response to an HTTP request.

Generally, the WAP gateways impose some form of data limitation on the amount of data which is transmitted to the WAP client 10. In one case, the gateway limitation is at or about 1.5 Kbytes (or about 1492 bytes). Hence, this presents an additional problem to content providers to design pages and applications which can provide useful content and information to a WAP client 10.

In addition to bandwidth limitations, device limitations present issues to content providers. The small screens of wireless devices mean display area is at a premium. In particular, the available display area of a wireless phone is limited to 4–10 lines, making the display of large amounts of data difficult. One technique used to address this issue is to allow a user to scroll the display up and down the page displayed on the device, in order to allow more information to be accessible to the user at a given time. Yet another limitation of such devices is the limited input/output mechanisms of such devices. Cell phones are limited to a keypad and a few additional control buttons. Hand-held PDA devices have small keyboards or pen-based input which requires input controls be placed on the screen. Even where a PDA or in some cases a pager has a full keyboard (i.e. the Blackberry™ wireless pager developed by Research In Motion, Waterloo Ontario, Canada), the size of such input devices means such input devices are not as functional as full-size keyboards.

In other types of devices where only a limited input mechanism is available, data organization and function mapping to limited inputs are known. For example, the mapping of letters of the alphabet to keypad numbers to input alphabetic characters into phone memory in, for example, cell phones is well known. Mapping other input functions to a device's limited input keys is known as well.

For example, the Startac® organizer manufactured by Motorola, Inc. is a PDA device which is designed to clip onto a cellular phone and interact with the phone. The organizer contains contact, calendering and notes information, and because of its size it is limited to four input buttons.

Content information in the organizer is organized alphabetically by an alphabetical tag similar to a paper telephone address book, with each entry alphabetized in accordance with its rules of display in a "display name" field. The user may then select individual tabs using the control buttons which identify further levels of granularity in the alphabetization. For example, the opening screen lists a set of tabs, each tab containing three letters (e.g. "ABC," "DEF," etc.) representing the first letter of the last name of each contact. Selecting "ABC" yields another set of tabs with single letter entries (e.g. "A," "B," "C," etc.) and selecting "A" yields all entries presented with the letter "A." If a number of entries are provided for the letter A which exceeds the 10-line display of the device, the device will further sort entries into a pre-configured number of further levels of granularity, for example all entries between "A" and "AI," "AR" and "AT," etc. The organizer will sort, alphabetize, and granularize each letter of the alphabet depending on the number of contacts beginning with that letter. Selection of different controls occurs through use of one of the six control buttons on the device.

SUMMARY

An embodiment of the invention, roughly described, comprises a method for converting a list of data, each entry in said list having at least one alpha-numeric character, to a format suitable for display and manipulation in a limited display area. The method comprises: sorting said list based on a first of said alpha-numeric characters in each said entry in said list of data; grouping entries into a plurality of sets, each set comprising entries in said list of data having at least a common first character; generating an abbreviated list of said first characters; and linking each entry in said abbreviated list to the corresponding set of entries having said at least common first character.

In one aspect, the sorting can comprise alphabetizing the list based on the first and any number of sequential characters in each entry in the list. The list can be divided into sets based upon a predetermined maximum number of allowable entries in the list, and the maximum number defined by the availability of input controllers on a device for which the list is intended. In a further aspect, the abbreviated list entries are mapped to input controllers on the device, and additional abbreviated lists or sets of entries having one or more letters in common are displayed responsive to input from the input controller.

BRIEF DESCRIPTION OF THE DRAWINGS

The invention will be described with respect to the particular embodiments thereof. Other objects, features, and advantages of the invention will become apparent with reference to the specification and drawings in which:

FIG. 1 is a block diagram of a wireless device coupling to an Internet view of a WAP gateway;

FIG. 2 is a block diagram of a network used in accordance with an embodiment of the present invention;

DETAILED DESCRIPTION

Figure 3:
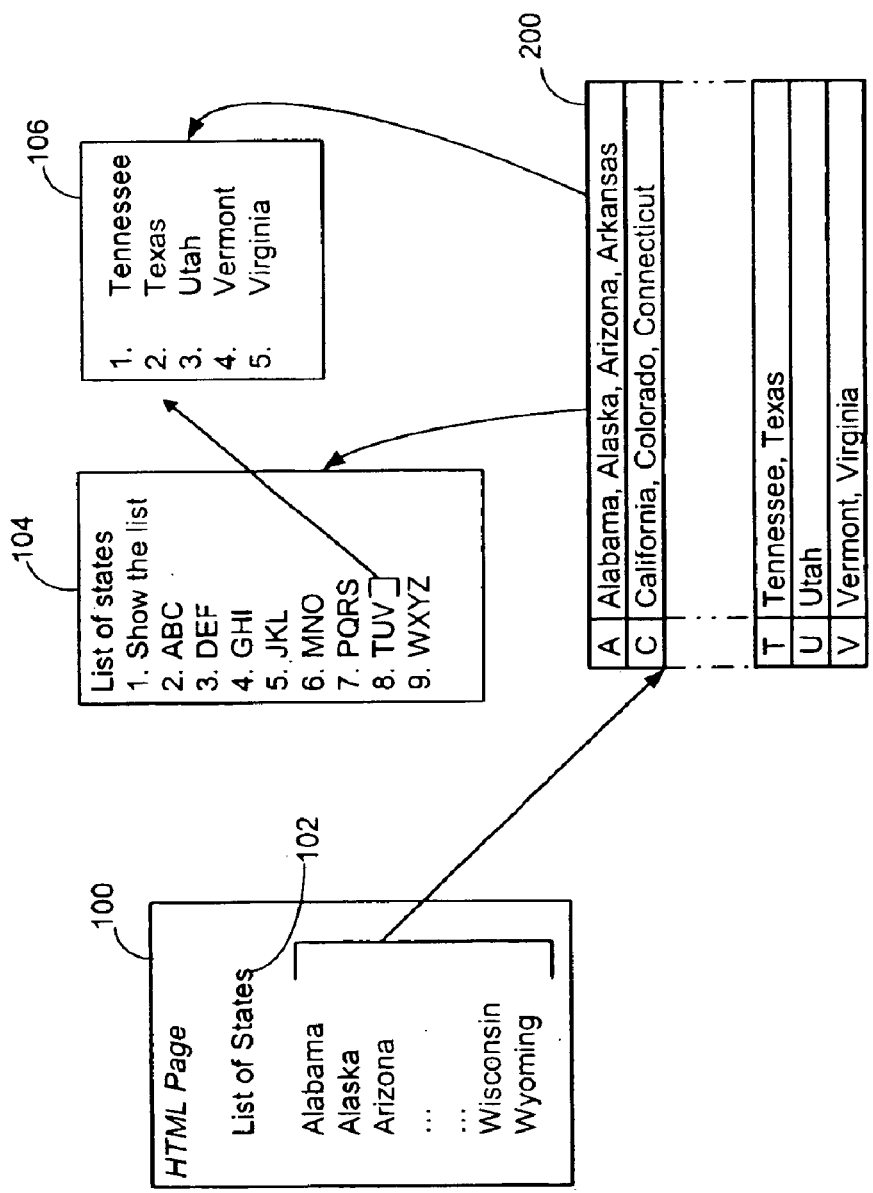
FIG. 3 is a graphic illustrating the list reduction and mapping algorithm according to an embodiment of the present invention.

An embodiment of the present invention, roughly described, provides a system and method for presenting long lists of items in a format which is suitable for display and interaction on a web browsing device having a small display and limited input/output capability. In particular, embodiments of the present invention are particularly suited to providing long lists of information in a usable format on wireless Internet-enabled cellular telephones.

Embodiments of the present invention provide particular applicability with respect to alphabetized lists, but it should be recognized that many different types of lists including numerical lists of, for example, a sequence of addresses or alphabetical lists of stock symbols may be processed in accordance with the present invention.

FIG. 2 shows a wireless client device 10 which may be a personal digital assistant, wireless cellular phone enabled with a micro browser, or other device capable of accessing a wireless network 15 which is coupled to a WAP gateway 20. Within the public Internet 25, a particular website server 50 is coupled to a WAP server 55 to provide content information to the wireless client 10. In accordance with the invention, the WAP server 55 which is fed content directly from a particular site server 50, includes a series of processes running on the particular format of the server and implemented by any number of known programming methods to implement an embodiment of the present invention.

The WAP server 55 in this embodiment is implemented by a provider or system administrator and implemented for specific content (such as specific web sites) or specific carriers (wireless networks).

For purposes of example, the method of the invention will be presented with respect to an alphabetical list of the fifty (50) United States. FIG. 3 shows an abbreviated representation of a list of states 100 having a title "List of States" 102 and an alphabetical listing of the 50 U.S. states beginning with Alabama and ending with Wyoming. As noted above, the wireless telephone specification limits the number of bytes of data which can be provided to a wireless phone through the WAP gateway 20, and further limits the display interactivity to approximately nine items, since only nine items can be mapped to a numeric keyboard with digits 1 through 0.

In accordance with an embodiment of the invention, the entries in the list are organized alphabetically, with a separate entry being made for each letter which begins a word so that all entries for that letter are thereby correlated to that letter. In one embodiment, this is done by creating a table as shown by example 200 in FIG. 3, wherein each entry for each letter includes all states beginning with that letter: Row "A" includes the entries Alabama, Alaska, Arizona, Row "C" is correlated to the entries California, Colorado, Connecticut, and so on.

Depending on the maximum number of available entries required on the list (nine in the case of an Internet-enabled cellular phone), the list may be granularized by dividing the total number of table entries by the number of available entries, and an abbreviated list 104 arranged for display as a WAP page on a cellular phone.

In list 104, because only eight slots are available (one slot, entry 1, is used for a command to "show the list"), twenty-six divides by eight three times with a remainder of two, meaning that at most entries (six), three table letters can be assigned, while two of the entries must be assigned four letters. The resulting abbreviated list 104 is shown in FIG. 3. In one embodiment of the invention, the choice has been made to map the alphabetical letters to the commonly-used standard letters to which the numerals on the phone are mapped as shown on a standard telephone keypad. However, it should be recognized that any mapping of entries to key pad controllers may be made. In the particular example shown in FIG. 3, it should be readily recognized that since there are no entries for some letters, such as "B," "E," "J," etc., hence these entries could be removed and the list shortened. For convention, in the example shown, the standardized mapping of letters to the numerals on the keypad on the telephone is utilized.

As further shown in FIG. 3, if a user selects number 8 on the keypad, the entries associated with the letters "T," "U," and "V," in this case the five entries Tennessee, Texas, Utah, Vermont, and Virginia, will be displayed in a second list 106. It should be recognized that the second list 106 has only five entries, substantially fewer than that allowed to be displayed on the nine available entries in a standard keypad. Hence, the complete list can be displayed.

Figure 4:
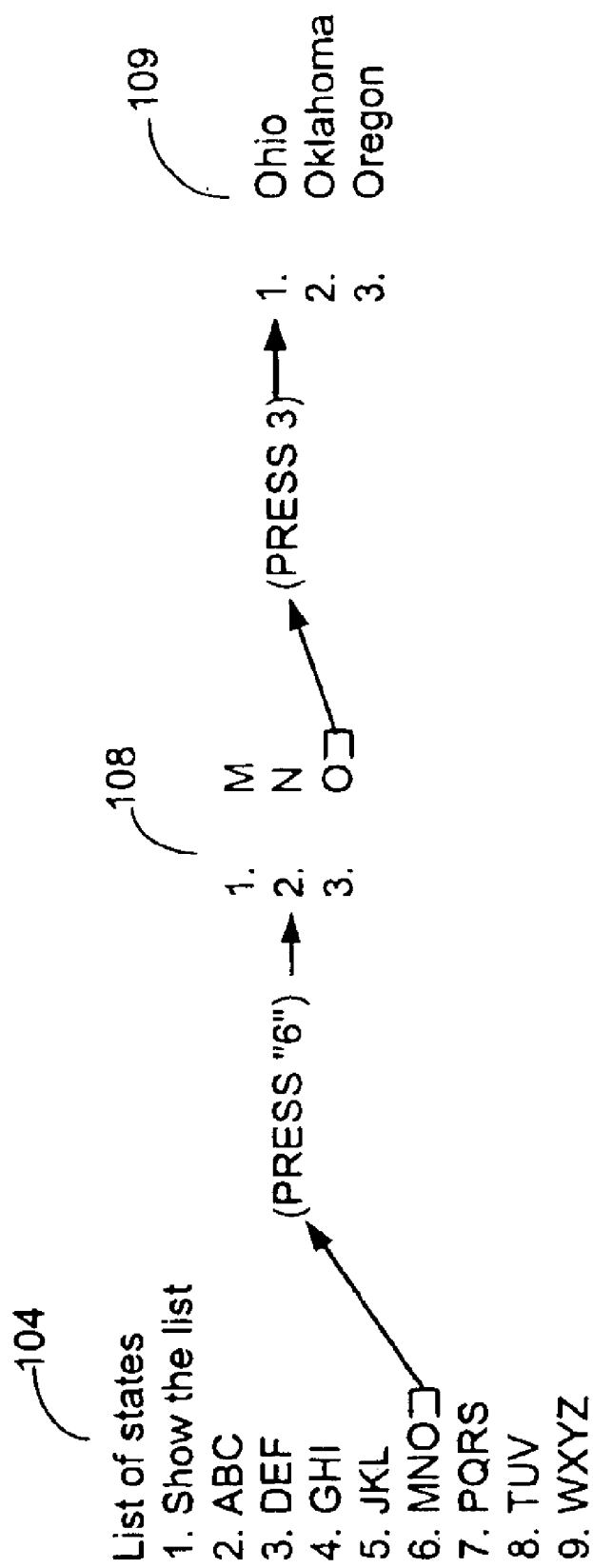
FIG. 4 is a graphic illustrating the list reduction and mapping algorithm according to another embodiment of the present invention.

In certain instances, the number of entries mapped to the individual letters in Table 200 will be longer than that available for the nine entries maximum allowed by the standard for a cellular phone. In that case, the method contemplates either providing multiple pages of list entries similar to entry list 106, each list incorporating nine entries, or performing an additional mapping step to subdivide the entries on the mapped list 104 and hence provide further granularity in the selection process. For example, in FIG. 4, a mapped list 104 may be used to select entry 6 which provides a list 108 of the letters "M," "N," and "O." There are nineteen states which begin with the letters M, N or O. As a result, selection of the number 6 can be allowed to be subdivided to allow the user to select between states beginning with M, N or O as shown in FIG. 4 at 108, and further to select states beginning with the letter O by depressing a 3 on the keypad, thereby resulting in a display of a list entries for letter O of Ohio, Oklahoma and Oregon.

In yet another embodiment of the invention, where lists longer than entries such as the U.S. states are utilized, alphabetization and mapping to a table such as table 200 may occur for more than one letter. For example, where a long list of entries such as addresses or cities occurs, entries may be subdivided for the letter "T" for all entries between "T" and "Th," "Ti" to "Tp" and "Tq" to "Tz." This multiple mapping granularity can occur for both alpha and numeric lists, and for multiple levels of characters in each entry in the list.

Figure 5:
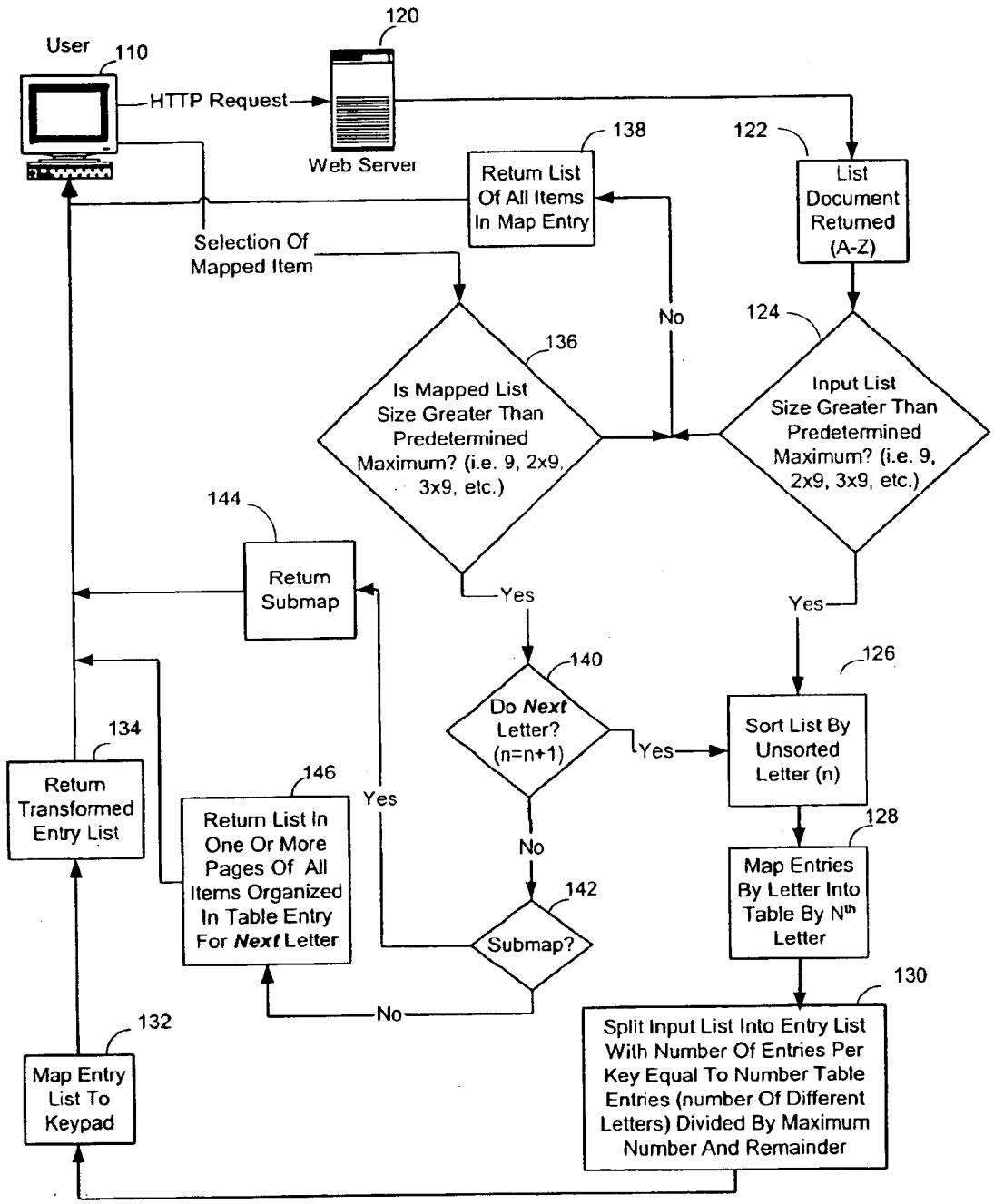
FIG. 5 is a flow chart depicting one embodiment of the process flow of the present invention.

FIG. 5 shows a flow chart representing the general method of the present invention. As one who is skilled in the art would appreciate, FIG. 5 illustrates logic boxes for performing specific functions. In alternative embodiments, more or fewer logic boxes may be used. In an embodiment of the present invention, a logic box may represent a software program, a software object, a software function, a software subroutine, a software method, a software instance, a code fragment, a hardware operation or user operation, singly or in combination.

As shown in FIG. 5, a user 110 utilizing a wireless Internet device or any other Internet-enabled device, will make an HTTP request to a web server 120 which contains any number of documents having a list of entries. On a WAP-enabled server which is provided by an administrator of an embodiment of the present invention, the list document is returned at logic box 122 and examined at logic box 124 to determine whether the input list in the document has a size greater than a predetermined maximum. In the present example where the list is intended to be diverted to user 110 using a wireless Internet-enabled phone, the maximum is nine or multiples of nine such as eighteen, twenty-seven, etc. The maximum can be chosen such that if, for example, the list is eighteen or fewer characters, the list is less than or equal to the allowed maximum and the inquiry to logic box 124 is "no," such that the list is returned in one or more pages to the user 110, as illustrated in logic box 138.

If the input list is greater than the predetermined maximum, the answer to decision query 124 is "yes," then the list is sorted by a process running on the WAP server to sort the list by the next unsorted letter at logic box 126.

In logic box 126, if the list is simply the list document 122 which is returned as a result of the HTTP request from user 110, the next unsorted letter will be the first unsorted letter (n) in each entry in the list. As discussed with respect to FIG. 3, the entries in the list are then mapped, as illustrated in logic box 128, by the relationship to the next letter into a table such that each entry is associated with its relationship to the next letter (n+1). In other words, all letter entries beginning with A are correlated to the letter A, all entries with B to the letter B, and so on.

At logic box 130, the table is examined and the number of table entries is divided by the maximum number of available input options for the device utilized by user 110. In the case of a WAP-enabled phone, this number is nine, so that the number of entries of the list is divided by nine and the resulting data is used at logic box 132 to map the table entries to data inputs, in this case the keypad, and the transformed list which has been mapped to the keypad is then returned at logic box 134 to user 110.

After the user receives the list, the user will generally select one of the mapped items and the method continues at logic box 136 with a determination of whether the mapped list size (i.e. the number of entries associated with the mapped item) is greater than the predetermined maximum utilized throughout the method of the present invention. If the mapped list size is not greater than the predetermined maximum, the method, as illustrated in logic box 138, will simply return a list of the entries associated with the map entry (for example as shown in FIG. 3, where the number of mapped entries is simply five).

If the number of entries in the mapped list is greater than the predetermined maximum, a decision in logic box 140 is made to determine whether to sort the next letter in the list. In the alphabetical example of states set forth above, the alphabetization by the second letter is not utilized, but were the example given by a list of U.S. cities having a population greater than 100,000, the answer to decision step 140 would likely be "yes" over several iterations so that the granularity of the mapping can be substantially increased by returning through logic box 126 to map the second, third, fourth, etc., letters in each entry.

If the answer to decision query 140 is "no" and the next letter in each entry is not to be mapped, a further determination may be made in logic box 142 as to whether or not a sub-map of entries will be required. As shown in FIG. 4, the sub-map may comprise all entries in a given key mapping returned at logic box 134. In the example shown in FIG. 4, this is letters "M," "N," and "O," which are returned, as shown in logic box 144, by depressing the keypad number 6. If no sub-map is required at logic box 142 (as in the example in FIG. 4 where the entry 3 is pressed from page 108), a list of mapped entries is returned at logic box 146 in one or more pages of all items organized in the table entry for the next letter.

It should be readily recognized that the methodology set forth in FIG. 5 may be implemented by any number of different processing paradigms. In the present example, a WAP server or other separate process server is utilized to implement the present invention. However, it should be recognized that the process need not be implemented by a WAP server. Moreover, the invention has equal applicability to wireline as well as wireless devices, especially where limited display devices or limited bandwidth networks are used. In addition, the invention finds particular application with respect to devices having limited small display or input capabilities.

It should be further recognized that the mapping capabilities of the present invention are not limited to keypads. For example, the methodology may be tailored to different types of inputs having more expanded or limited input capabilities, such as pagers having a more limited number of buttons, or full keypad wireless pagers having a greater number of input entries.

These and other advantages of the present invention will be readily apparent to one of average skill in the art. All such features and advantages of the invention are intended to be within the scope of the invention as illustrated by the written description and the drawings, and defined by the attached claims.

What is claimed is:

1. A method for converting a list of data items into an abbreviated list for transmission through a wireless network, comprising:

alphabetizing the list of data items based on at least a first letter in each data item;

separating the alphabetized data list into a plurality of sets; and generating a first abbreviated list having a maximum number of entries, each entry mapped to a keypad input in a display device, each entry representing at least one set, wherein the display device displays the first abbreviated list along with the mapping to the keypad input.

2. The method of claim 1, further comprising:

generating at least a second abbreviated list based on members of at least one of the entries of the first abbreviated list wherein each entry in the second abbreviated list represents at least one set represented by the at least one entry of the first abbreviated list.

3. The method of claim 1 wherein each set represents the data items beginning with at least a same first letter.

4. The method of claim 1 wherein said step of alphabetizing comprises alphabetizing the list based on at least said first letter and a second letter.

5. The method of claim 1 wherein the mapping comprises mapping each entry of said list to a keypad on a telephone.

6. The method of claim 1 wherein said method includes the steps of:

determining whether a sub-list of data items has a size greater than a predetermined maximum size; and if said sub-list is greater than said predetermined maximum size, alphabetizing said sub-list based on at least a next sequential letter in each said data item.

7. The method of claim 6 wherein new sub-lists are formed from the sub-list and wherein determining and alphabetizing steps are done on at least one of the new sub-lists.

8. The method of claim 1 wherein said maximum number of entries is defined by:

determining a predetermined maximum number of entries;

dividing the number of entries in the first abbreviated list by said predetermined maximum; and generating the abbreviated list such that each entry in the first abbreviated list has a number of entries equal to the number of entries in the list divided by said maximum with a remainder of no more than one.

9. The method of claim 1 wherein said first abbreviated list has a number of entries greater than the number of lines in a display of a device, and the abbreviated list is divided into at least two pages for display on the device.

10. A method for converting a list of data, each entry in said list having at least one alpha-numeric character, comprising:

sorting said list of data based on a first of said alpha-numeric characters in each said entry in said list of data;

grouping entries into a plurality of sets, each set comprising entries in said list of data having at least a common first character;

generating an abbreviated list of said common first characters, each entry of the abbreviated list being mapped to a keypad input in a display device, wherein the display device displays the first abbreviated list along with the mapping to the keypad input; and linking each entry in said abbreviated list to the corresponding set of entries having said at least said common first character.

11. The method of claim 10, further comprising:

generating at least a second abbreviated list based on members of the set wherein each entry in the second abbreviated list is a first letter in said abbreviated list and represents a second set of all entries in the data list beginning with one letter.

12. The method of claim 10 wherein said sorting step comprises alphabetizing the list based on initial letters.

13. The method of claim 10 wherein said method further comprises displaying a list of items mapped to one input controller.

14. The method of claim 13 wherein said displayed list of items comprises initial letters if the items in the set corresponding to each said characters exceeds said maximum list length.

15. The method of claim 10 wherein the mapping comprises mapping each entry on said list to a keypad on a telephone.

16. The method of claim 10 wherein said method includes the steps of:

determining whether a sub-list of data items has a size greater than a predetermined maximum size; and if said sub-list is greater than said predetermined maximum size, alphabetizing said sub-list based on at least a next sequential letter in each said data item.

17. A method for presenting a list of alpha-character data, comprising:

grouping the alpha-character data into a number of groups; and providing a display indicating first associations of numeric control inputs with the groups, wherein if the number of groups exceeds the number of numeric control inputs, multiple groups are associated with a single numeric control input.

18. The method of claim 17, wherein numeric control inputs 1–9 are associated with groups.

19. The method of claim 17, wherein when multiple groups are associated with a single numeric control input, selection of the single numeric control input results in a display indicating second associations of numeric control inputs with the multiple groups.

20. The method of claim 19, wherein the second associations are selections of a single first letter.

21. The method of claim 17, wherein the first associations are selections of groups of first letters.

* * * * *